United States Patent [19]

Haines

[11] 4,177,566
[45] Dec. 11, 1979

[54] INSOLATION SURVEY DEVICE

[76] Inventor: Bernard M. Haines, Box 914, Glenwood Springs, Colo. 81601

[21] Appl. No.: 862,778

[22] Filed: Dec. 21, 1977

[51] Int. Cl.$^2$ ............................................. G01C 1/00
[52] U.S. Cl. .................................. 33/1 DD; 33/273; 356/213
[58] Field of Search ............. 33/1 DD, 1 R, 261, 268, 33/271, 272, 273, 276, 227, 228; 356/213, 121

[56] References Cited

U.S. PATENT DOCUMENTS

| 830,769 | 9/1906 | Chandler | 33/273 |
|---|---|---|---|
| 1,817,350 | 8/1931 | Clay | 33/1 DD |
| 2,884,697 | 5/1959 | Sylvester | 33/1 DD |
| 3,002,278 | 10/1961 | Weems | 33/268 |
| 4,015,116 | 3/1977 | Bahm | 356/215 |

*Primary Examiner*—Richard E. Aegerter
*Assistant Examiner*—John W. Shepperd

[57] ABSTRACT

An insolation survey device for determining the exposure of a reference point to a cyclically varying radiation source. The device employs a base member for horizontally supporting a display sheet premarked with a grid calibrated in units corresponding to the measurement being taken. A transparent reflective member is supported by the base member over the display sheet so that a reflected view of the surrounding appurtenances and the view of the display sheet, through the transparent dome, form one composite picture. In the composite picture so formed, the period or periods, if any, within the radiation cycle that the reference point will be exposed to said radiation appear as unobstructed sky superimposed onto the premarked grid. A compass is provided to directionally align the device and means are provided for orienting the base member in a true horizontal plane.

12 Claims, 8 Drawing Figures

INSOLATION SURVEY DEVICE

FIELD OF THE INVENTION

The invention relates with particularity to an insolation survey device whereby a graphical representation can be produced of the total sun exposure of a reference point at any given time during a year.

BACKGROUND OF THE INVENTION

The amount of direct sunlight which a proposed structure will receive in a year, as well as the times of day, of the exposures have long been considered an important consideration for the designers of structures. Depending upon the climate where the building is to be situated, designer may locate windows and doors on the sun or shade side of the structure corresponding to whether or not the sun can be advantageously employed as a supplemental source of light and heat.

A critical need for advance knowledge of sunlight exposure has arisen with the increased utilization of solar energy as a source of heating, cooling, or power generation. This advance knowledge is essential if solar power is to be a viable and economically feasible energy alternative in any given application.

Where the use of solar energy is being considered, it is essential to know the aggregate sunlight exposure at the location of utilization. The exposure calculations, when combined with existing solar data and calculations of the angles of solar radiation, taken together with such variables as probable cloud cover, enables an accurate determination of the available solar power in advance of costly implementation.

Numerous prior art devices for measuring the degree of exposure of a preselected reference point to direct, natural sunlight are known in the art, for example, the device of Sylvester disclosed in U.S. Pat. No. 2,884,697 issued in 1959. Devices of such type require scale models of structures and other natural obstructions to direct sunlight which can be placed in juxtaposition within a hemisphere into which movable light, representing the sun, is directed tracing the normal path of the sun relative to the models. Such devices provide a simulation of direct sunlight exposure, but suffer the disadvantages of requiring the preparation of scale models and do not facilitate the production of a graphical representation of aggregate sunlight exposure.

SUMMARY OF THE INVENTION

The prior art devices, while providing the limited capability of determining direct sunlight exposure, have failed to provide a simple and inexpensive apparatus for determining the aggregate sunlight exposure of a preselected location while taking into consideration the time of day, season of the year, and existence of surrounding appurtenances. It is, therefore, a principal object of this invention, to provide an insolation survey device for producing a graphical representation of the amount of direct sunlight which can be incident upon a particular location for each hour of the day on selected days of the year.

It is another object of this invention to provide an insolation survey device by means of which graphs may be prepared showing potential sunlight exposure at a preselected location, while compensating for surrounding obstructions to the sunlight.

It is another object of the invention to provide a device which enables an on site preparation of a graphical representation and analysis of the solar characteristics of any specific location.

It is another object of this invention to provide an insolation survey device which may be directionally aligned at its location of use, either by direct use of the reflection of the sun, together with knowledge of correct solar time or by use of a magnetic compass.

Yet another object is to provide an insolation survey device which includes means for orienting the device in a true horizontal plane.

It is also an object of this invention to provide an insolation survey device which allows the measuring of a plurality of sun dependent physical properties of a selected location, for example: the sun's path for any day of the year at the location surveyed; determination of the periods of time for any day of the year when direct sunlight will fall on the surveyed site; energy content of received radiation; angle of azimuth and angle of altitude for the sun of any time for any day of the year at the site, thereby enabling a relatively fast and simple determination of, for example, solar collector size for a specific location;

It is still another object of the invention to provide a device which may be employed to determine the horizontal and vertical angles between surrounding appurtenances on the landscape as measured from the location of the device of the invention.

These and other objectives are performed by an insolation survey device which comprises a base member for supportting a premarked grid in a horizontal plane and a reflective means over the grid. Images of surrounding appurtenances which are on the landscape are provided by reflective means, which reflected image together with the premarked grid forms a composite picture. The pattern visualizable in the composite picture formed includes the effect of all surrounding obstructive appurtenances to the solar radiation.

The specific determination made by the survey device of the invention depends upon the calibrations of the premarked grid. When using a grid calibrated in increments of solar time and selected days of the year, the composite image created by the device will determine the possible direct solar radiation of the surveyed site by hours of the solar day and days of the year.

BRIEF DESCRIPTION OF THE DRAWINGS

The novel features which are characteristic of the invention are set forth with particularity in the appended claims. The invention itself, however, both in its organization and operation, together with further objects and advantages thereof, may best be understood with reference to the following description when considered in conjunction with the accompanying drawings wherein:

DESCRIPTION OF PREFERRED EMBODIMENTS

Figure 2:
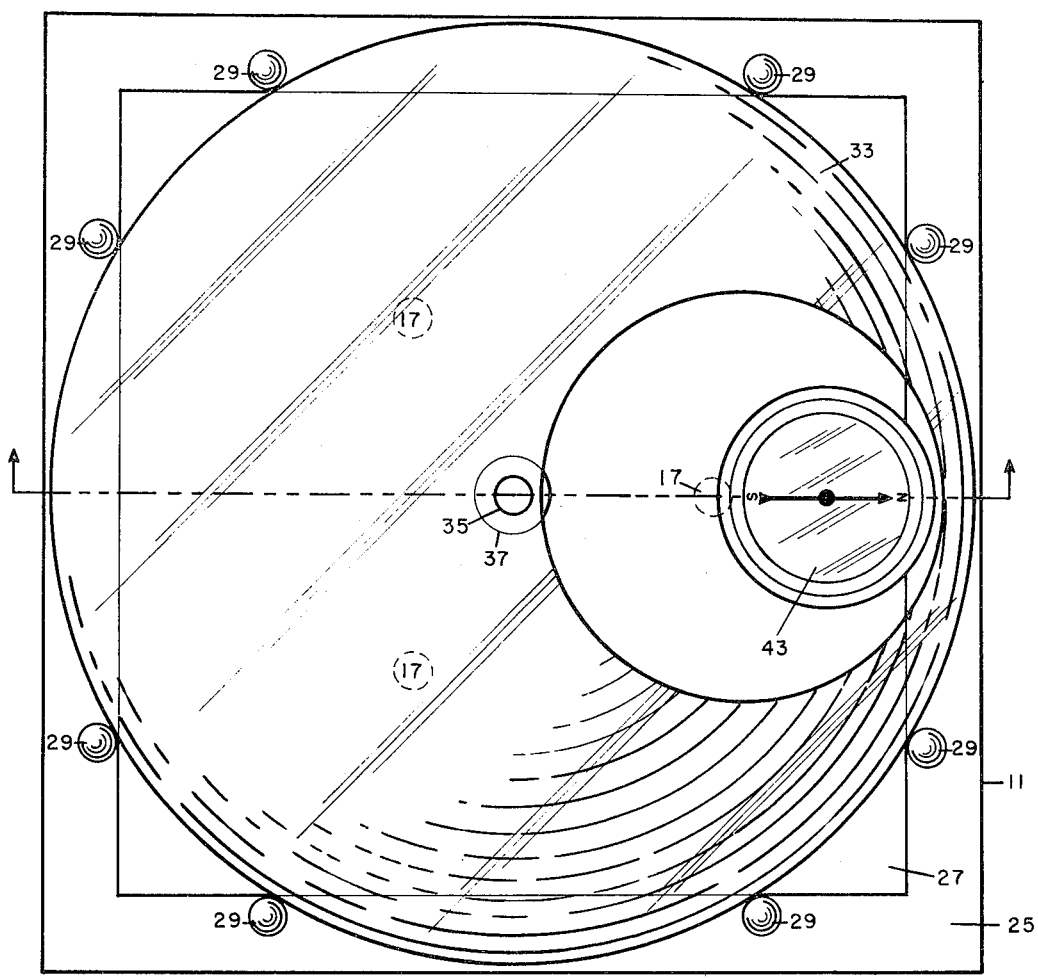
FIG. 2 is a top view of the insolation survey device shown in FIG. 1.

Referring to the drawings in which like members have been indicated by the same numbers, the insolation survey device of the invention comprises a planar support plate 11 adapted to be adjustably and removably mounted on a base support member 13.

While the insolation survey device of the invention may be readily supported by any means for example, the ground, in the preferred embodiment, the base support member 13 is mounted on a tripod or other support means (not shown) by means of the threaded opening 15 in baseplate 13. The illustrated embodiments of FIGS. 1, 2, 3, and 4 show examples of supporting means for the support plate 11 which enables horizontal and directional orientation of the planar support member 11. For example, in the illustrated embodiment of FIG. 1, the undersurface of planar support plate 11 is provided with three downwardly extending support legs 17 which movably engage the curved surface of base plate 13 to enable horizontal and directional orientation. As shown in the embodiment of FIGS. 3 and 5, base support plate 11 includes a generally downwardly convex undersurface 17. In the embodiment shown in FIG. 3, base plate 13 is provided with a support ring 14 on which a downwardly curved undersurface 17 of the planar support plate 11 of FIG. 3 is adjustably and removably mounted. In the embodiment of FIG. 5, base plate 13 is provided with upwardly extending legs 16 on which a curved undersurface 17 of the planar support plate 11 of FIG. 5 is movably mounted.

The planar support plate 11 has incorporated therein a leveling means indicator 21 situated in a centrally located position of the support plate 11. The leveling means indicator 21 could, for example, comprise a hermetically sealed capsule filled with fluid containing a small floating bubble of gas 12. The top of leveling indicator 21 is premarked with a leveling ring 22 wherein the bubble 12 is centered when the leveling indicator 21 is oriented in a true horizontal plane. Leveling of the device may be easily and readily accomplished by simply adjusting the position of planar support surface 11 on base support 13. It should be recognized, however, that other indicator means could be employed to indicate when the support plate 11 is horizontally aligned.

Figure 1:
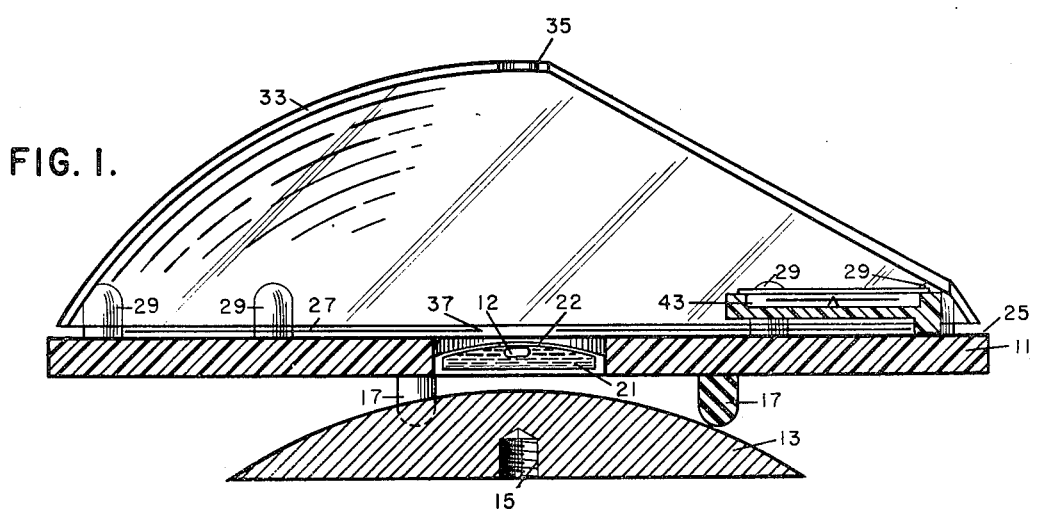
FIG. 1 is a vertical cross sectional view of an embodiment of the insolation survey device of the invention.

Planar support plate 11 has an upper surface 25, which, as will hereinafter be described, is to support display sheet 27 premarked with grids and/or other data. Means are provided to align the display sheet on the support plate, for example, the pegs 29 on plate 11 illustrated in the embodiment of FIG. 2 and the alignment ring 30 shown in the embodiments of FIGS. 3 and 5 together with alignment rings 32 shown in FIG. 4. The support plate 11 also supports a suitably curved transparent reflective dome 33 over the planar support plate 11. Reflective dome member 33 is aligned and held in alignment on planar support plate 11, and with respect to display sheet 27 by, for example, pegs 29 as illustrated in FIG. 1, and the circumferential surface 31 of circular planar support plate 11 as illustrated in FIG. 3 and 5. The apex of dome member 33 is premarked with a central alignment ring or opening 35 which, when using the instrument, is visually aligned with leveling ring 22 through aperture 37 in display sheet 27. Horizontal alignment of the instrument can thus be checked from the eye, or camera, viewing position directly above the instrument. As illustrated in FIG. 1, dome 33 is aligned on support plate 11 by pegs 29 which retains the edge of the dome. In this specific embodiment dome 33 "holds down," and pegs 29 retain, display sheet 27 against the surface 25 of support plate 11. In the illustrated embodiments of FIGS. 3 and 5, the inner edge of dome 33 closely encircles the circumferential surface 31 of the support plate 11 aligning dome 33 on the support plate by retaining the inner edge of dome 33 sealed on the abutment 34 of the base plate. Surface 18 of dome 33, holds the outer edge of display sheet 27 against surface 25 of support plate 11.

Figure 4:
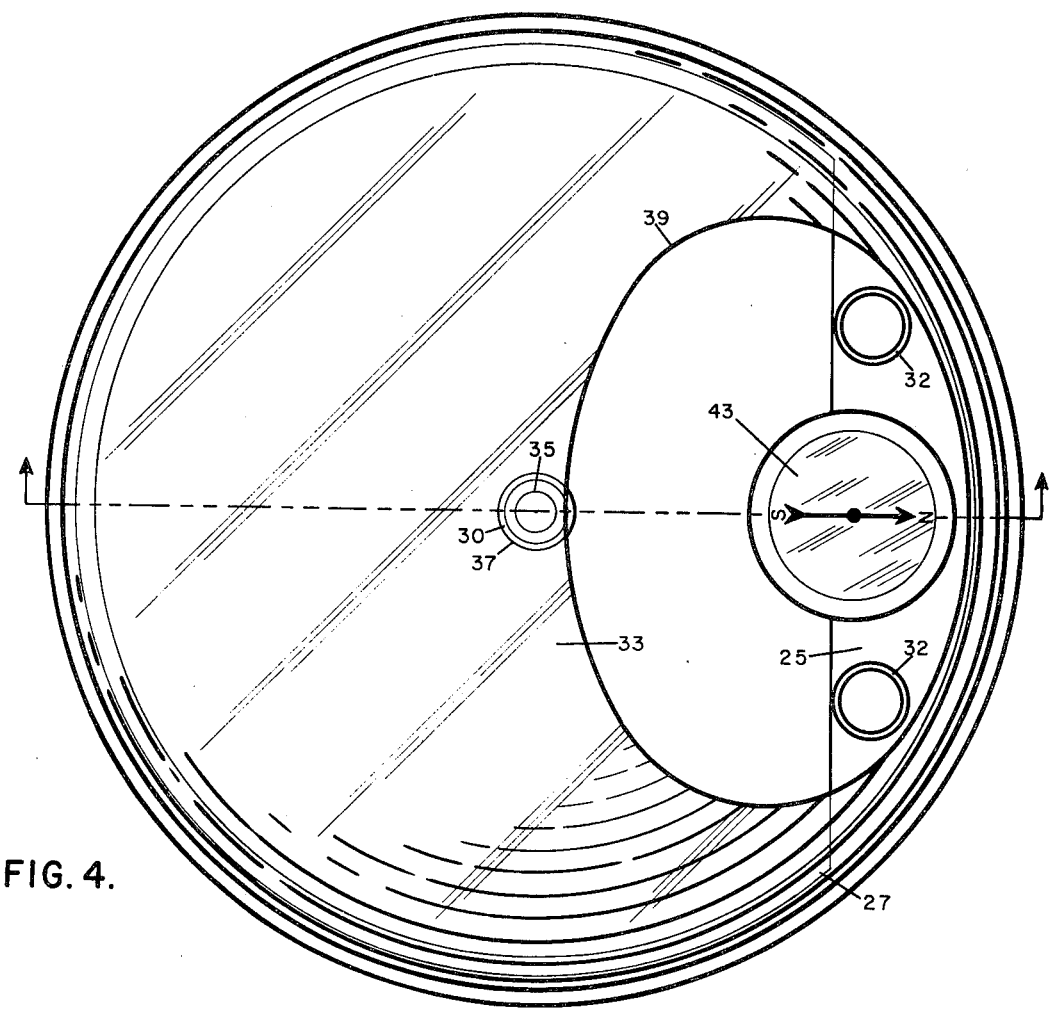
FIG. 4 is a top view of the insolation survey device embodiment shown in FIG. 3.
Figure 3:
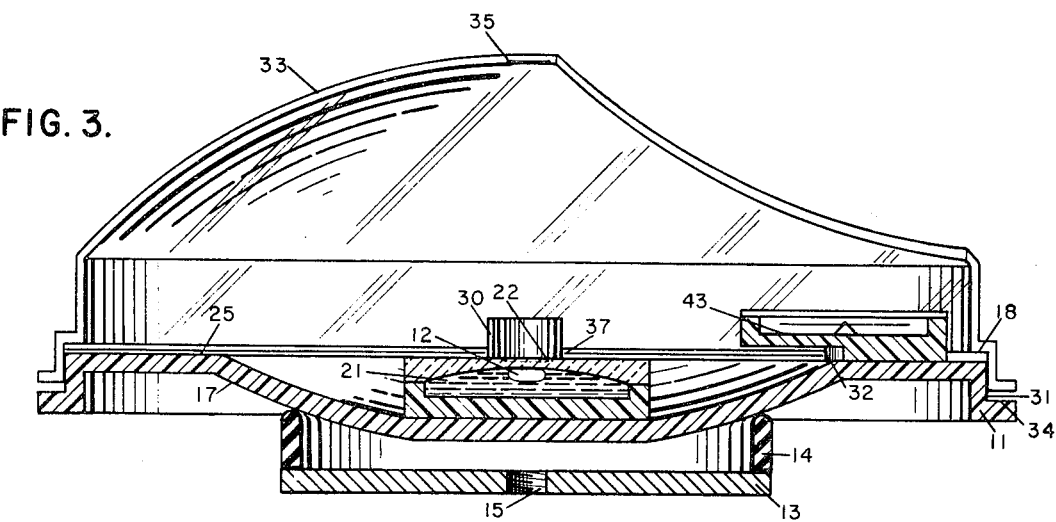
FIG. 3 is a vertical cross sectional view of another embodiment of the insolation survey device of the invention.
Figure 5:
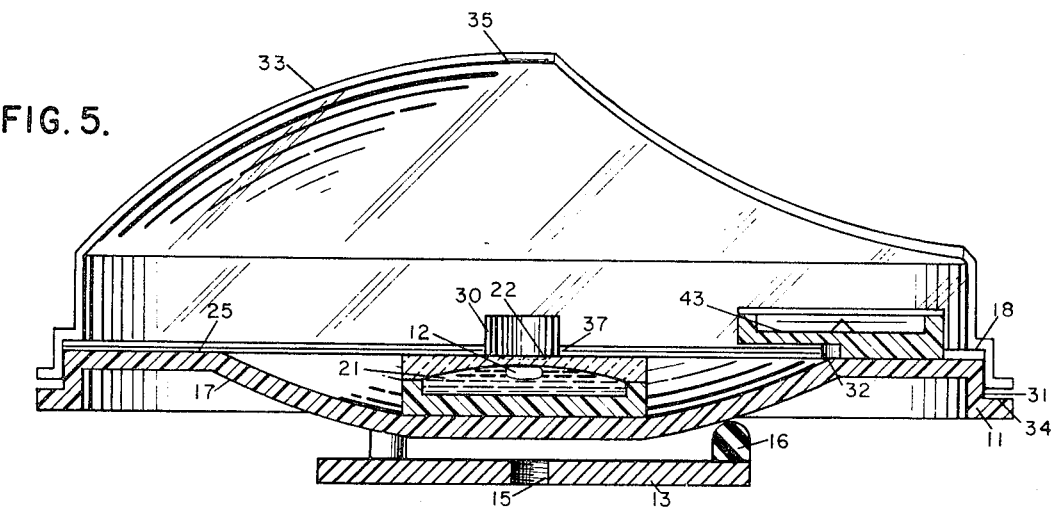
FIG. 5 is a vertical cross sectional view of another embodiment of the insolation survey device of the invention.

FIGS. 2 and 4 illustrate a top view of the insolation survey device of FIGS. 1 and 3, respectively. Display sheet 27 in contact with upper surface 25 of support plate 11, can be seen through transparent dome member 33. In operation, display sheet 27 is centered on support plate 11 in such manner that the opening 37 in the display sheet lies over the leveling ring 22. As described hereinbefore, in the embodiments of the invention depicted in FIGS. 3 and 5, the central opening 37 in the display sheet fits over an alignment ring 30 and is prevented from rotation out of alignment by additional alignment rings 32 against which the edge of the display sheet abuts.

A large opening 39 is provided in dome 33 to enable tracing graphs of potential radiation exposure on the display sheet 27. An overlaying tracing sheet may also be used effectively in a manner which will hereinafter be described.

A polar, directional indicator 43 is provided on the support plate 11 to enable directional alignment of the insolation survey device. In the preferred embodiment, the directional indicator 43 comprises a compass.

Figure 6:
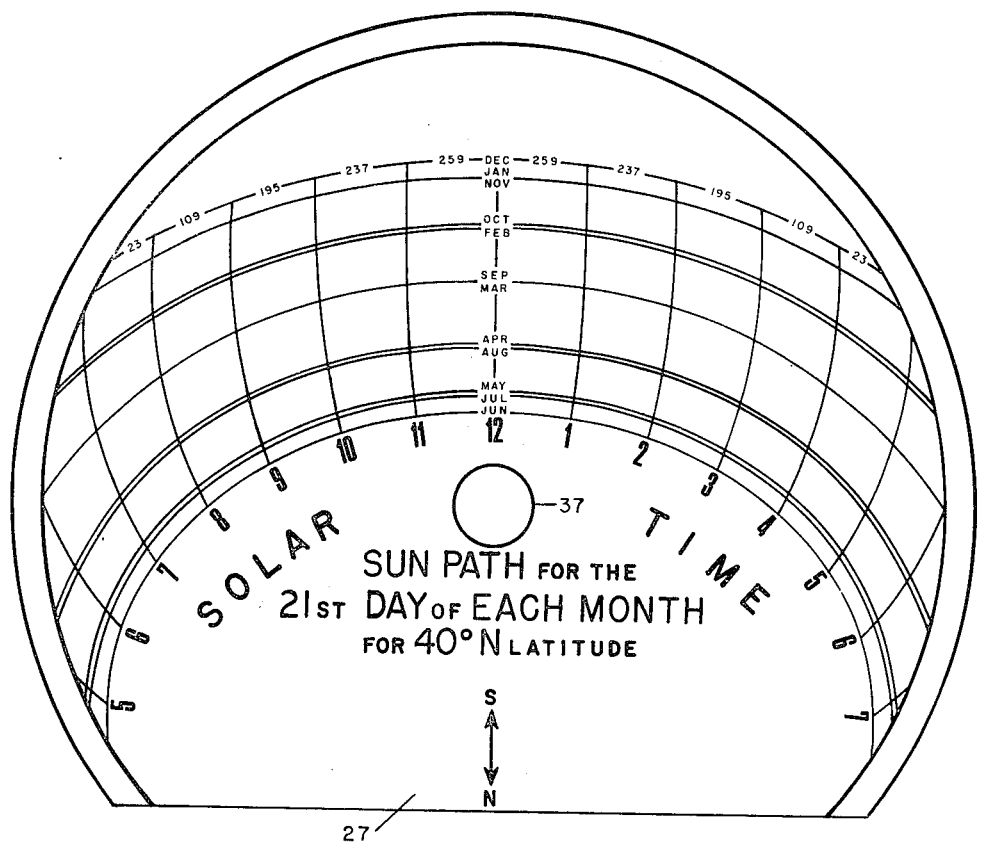
FIG. 6 is a view of a premarked solar time grid to be employed by the insolation survey device of the invention to produce a graph of the dates and times when direct sunlight can be received at the site of the survey.

FIG. 6 illustrates a display sheet which may be employed in the insolation survey device of the invention when it is desired to provide a graph of sunlight exposure for a specific area. This illustrated display sheet has been premarked with a grid containing longitudinal markings corresponding to solar time in increments of hours and latitudinal graduations corresponding to specific data within the year. The central aperture 37 in the display sheet is provided to permit leveling ring 22, used for leveling and viewing alignment, to be visible from above. In the preferred embodiment, the display sheet comprises light markings on a dark background and/or a slightly darkened dome 33 in order to improve the reflected image quality of dome reflections.

Figure 7:
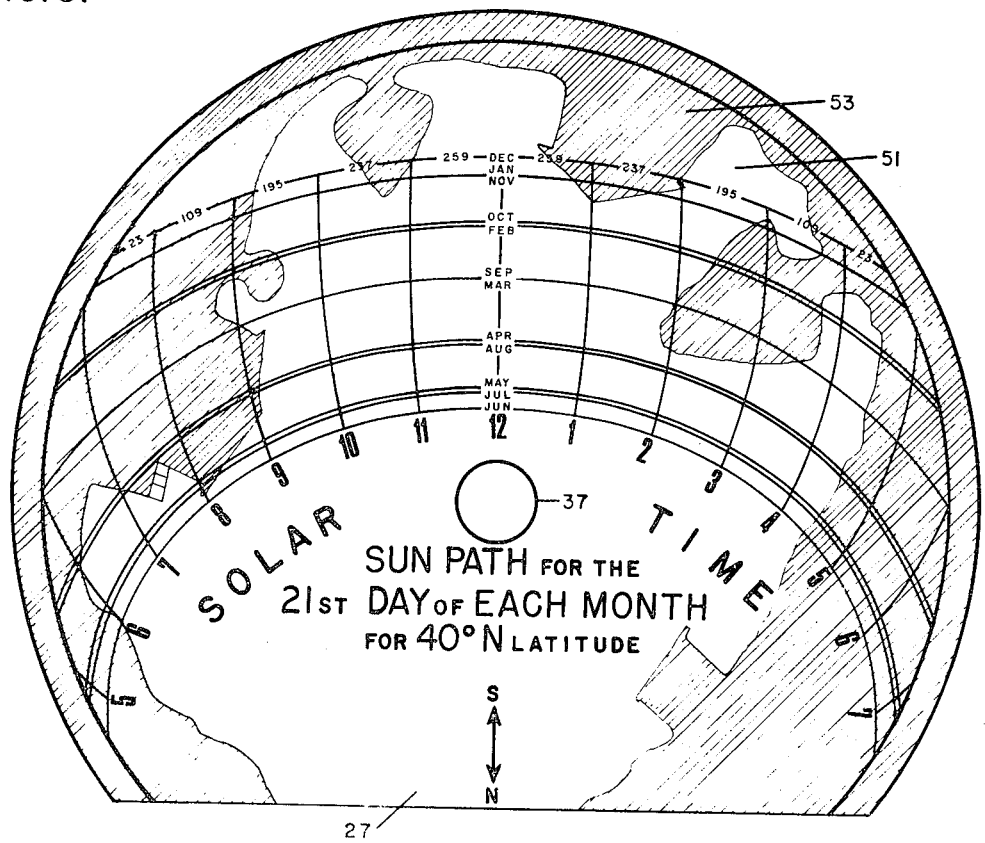
FIG. 7 is a simulated view of a direct sunlight exposure graph prepared in the device of the invention.

FIG. 7 exemplifies a pattern of potential sunlight exposure which has been determined by using a display sheet similar to that depicted in FIG. 6 within the insolation survey device. As previously described with respect to FIGS. 1, 3, and 5, the display sheet is placed on the support plate 11 and the support plate is horizontally and directionally aligned. The pattern as shown in FIG. 7 is formed by light reflecting off of the dome, providing a view of surrounding objects reflectively composited with the markings of display sheet 27. The reflected image comprises areas of dark shading 53 where sunlight would be obstructed and light areas 51 where direct sunlight would not encounter any obstructions and could fall directly on the instrument location. As seen in FIG. 7, the dilineations between light areas 51 and shaded areas 53, is irregular in shape since it is patterned from the obstructions to direct sunlight which surround the location of the insolation device. Examination of the pattern shown in FIG. 7 reveals that direct sunlight could fall on the location being examined from approximately 6:00 a.m. through 4:30 p.m. on June 21st, and from 9:00 a.m. to 2:00 p.m. and again from 3:30 p.m. to 4:30 p.m. on March 21st. Similarly, by referring to the potential sunlight pattern shown in FIG. 7, it is possible, for example, to determine specifically during what hours of selected days of the year direct sunlight will be permitted to strike this particular location. It will be readily recognized that this may be combined with the known amount of energy received per unit area of collector surface of specified orientation for that latitude on the specific hours of the designated days. This combination, together with the known probability of overcast skies, may be used to obtain reliable data of the collectable energy at a particular location. This data may be employed to determine whether the location of the insolation device is suitable for the economical placement of a solar energy collector or transducer. Values of the energy (in Btu per hour per square foot of south facing vertical collector) received for each hour on December 21st have been added to the display sheet shown in FIG. 7 to illustrate how numerical data can be shown directly on display sheets. This allows rapid interpretation of the basic sun path information provided by this instrument. Examination of the pattern reveals that on the selected date, December 21st, direct sunlight can furnish $195 \times \frac{3}{4}$ hour plus $237 \times \frac{1}{2}$ hour plus $259 \times 1$ hour plus $259 \times \frac{1}{2}$ hour plus $195 \times 1$ hour plus $109 \times \frac{1}{2}$ hour for a daily total of about 900 Btu for each square foot of the specified collector. This value need only be corrected for the average cloud cover for this location and time of year to provide a final figure of collectable energy. Also, as previously mentioned, the pattern shown in FIG. 7 would provide the designer of a proposed structure with a visible representation of the amount of direct sunlight which would be available as an alternate light and heat source.

Figure 8:
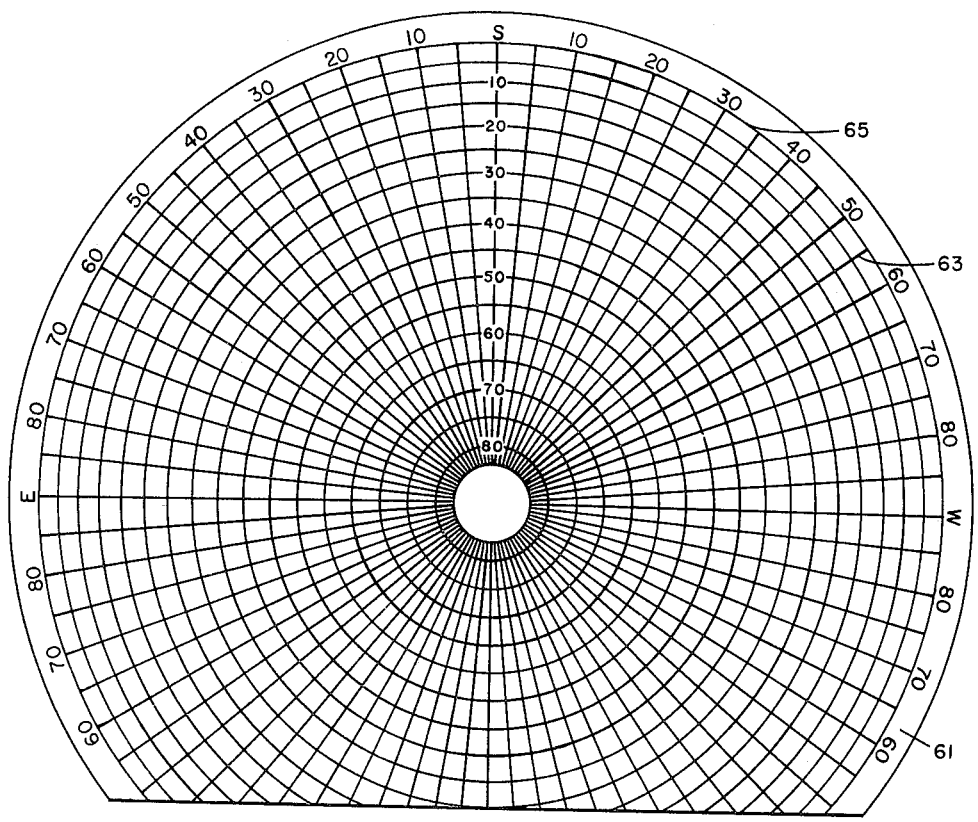
FIG. 8 is a view of a premarked grid which may be employed in the insolation survey device of the invention when it is desired to determine the horizontal and vertical angles of appurtenances on the landscape relative to specific reference of a viewer from the survey device location.

FIG. 8 is an example of a premarked display sheet which may be employed for relatively fast surveying. Display sheet 61 contains radial graduations 63 and graduations 65 in the form of concentric circles. When display and the device is directionally and horizontally aligned, a pattern of surrounding objects, similar to that depicted in FIG. 7 will be observed reflected by the reflective dome which reflections will appear to be superimposed onto the display sheet. Displacement of obstructing appurtenances from true north or south toward east or west is determined by noting where the radial graduations 63 of the display sheet 61 appear to intersect the reflected appurtenance in the view. Likewise, vertical angular displacement of the appurtenances from horizontal as viewed from the point wherein the insolation survey device is located, can be determined by noting where the concentric circles appear to intersect the image of the specific appurtenance.

As an additional facility of the insolation survey device, a sheet of transparent or nearly transparent material, for example frosted acetate, may be placed over the display sheet supported on the support plate to provide a surface whereon a trace can be made of the pattern of reflection so that the pattern can be analyzed at a later period. The tracing may be performed by placing the transparent material which has been precut to the same configuration as the display sheet 27 over the display sheet 27. A tracing instrument, such as a white pencil, may be then inserted through the large opening 39 in the dome 33 for easy tracing of the boundry between unobstructed sky and that obstructed by various appurtenances in the field of view.

The foregoing description is intended to be explanative of the insolation survey device of the invention and it will be understood from the foregoing that various changes and substitutions may be made in the embodiments described and illustrated without departing from the spirit and scope of the invention.

The scope of the invention is defined by the following claims:

I claim:

1. An insolation survey device for forming visual representation of the quantity of direct, time-varying exposure of a pre-selected location to solar radiation comprising means reflecting said radiation for forming a visible, reflected pattern corresponding to said areas of direct radiation, calibrated display sheet means for forming a composite visual image of said calibrations with said visual reflected patterns; direction indicating means for said display sheet and means for leveling said display sheet with respect to the horizontal.

2. The insolation survey device of claim 1 further including a horizontally alignable planar surface for supporting said calibrated display sheet means beneath said reflecting means.

3. The insolation survey device of claim 2 wherein said reflecting means comprises a thin, transparent dome supported by planar surface above said calibrated display sheet.

4. The insolation survey device of claim 3 wherein said planar surface further includes means for directionally aligning said insolation survey device.

5. The insolation survey device of claim 4 wherein said directional alignment means comprises a magnetic compass.

6. The insolation survey device of claim 2 further including means for aligning said planar surface in a horizontal plane.

7. The insolation survey device of claim 6 wherein said aligning means comprises a bubble level and an alignment ring whereby said planar surface is horizontally aligned when said bubble in said level is centered in said alignment ring.

8. The insolation survey device of claim 7 wherein said transparent dome further includes a tracing aperture adapted to provide access to the interior of said dome for tracing said image of direct areas of radiation on said display sheet.

9. An insolation survey device for forming a visible representation of the quantity of direct exposure of a preselected location to light radiation from a radiation source, said visible representation comprising shadow areas representing appurtenant obstructions to said direct exposure and lighter areas representing said direct exposure, said insolation survey device comprising:
a planar surface;
means above said planar surface for receiving light radiations and reflecting said light in such manner as to form a visual representation of surrounding appurtenances;

a calibrated display sheet means supported on said planar surface on which the reflected images of surrounding appurtenances are visible to the end that said visual representation of surrounding appurtenances appear to be superimposed on said calibrated sheet means; means for directionally aligning said display sheet and means for aligning said display sheet with respect to the horizontal.

10. The insolation survey device of claim 9 wherein said display sheet means is calibrated in increments of solar time and calendar dates whereby the periods of direct radiation exposure of said pre-selected location for a predetermined date may be computed by adding the time intervals representing direct exposure on said predetermined date.

11. The insolation survey device of claim 9 wherein said display sheet means is calibrated with (1) concentric circles appropriately spaced from the center of a display sheet and (2) uniformly spaced radial lines extending from the center of said display sheet. The horizontal and vertical angle between a said appurtenance viewed from said pre-selected location and reference point can be determined from the intersection of said image representing said appurtenance and a said radial line and a said concentric circle on said display sheet.

12. An insolation survey device for forming a visual pattern of the amounts of direct time varying exposure of a pre-selected location to solar radiation comprising:

a planar support;

means above said planar surface for receiving solar radiations and reflecting said radiations in such manner as to form a visual representation of surrounding appurtenances thereon;

means for aligning said support plate in a horizontal plane;

means for directionally aligning said support plate;

and a calibrated display sheet means supported on said planar support plate on which the reflected pattern of surrounding appurtenances reflected on said radiation receiving means appear to be superimposed.

* * * * *